(12) United States Patent
Hoshuyama et al.

(10) Patent No.: US 8,089,537 B2
(45) Date of Patent: Jan. 3, 2012

(54) IMAGE PROCESSING SYSTEM AND IMAGE PROCESSING PROGRAM FOR DEFECTIVE PIXEL CORRECTION

(75) Inventors: Hideo Hoshuyama, Kawasaki (JP); Masato Takeishi, Yokohama (JP); Keiichi Nitta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 671 days.

(21) Appl. No.: 11/988,273

(22) PCT Filed: Aug. 22, 2006

(86) PCT No.: PCT/JP2006/316425
§ 371 (c)(1),
(2), (4) Date: Jan. 4, 2008

(87) PCT Pub. No.: WO2007/023817
PCT Pub. Date: Mar. 1, 2007

(65) Prior Publication Data
US 2009/0079853 A1 Mar. 26, 2009

(30) Foreign Application Priority Data
Aug. 23, 2005 (JP) ................................ 2005-241570

(51) Int. Cl.
*H04N 9/64* (2006.01)
(52) U.S. Cl. ...................................................... 348/246
(58) Field of Classification Search ........... 348/246–247
See application file for complete search history.

(56) References Cited

U.S. PATENT DOCUMENTS

| | | | |
|---|---|---|---|
| 6,642,960 B1 * | 11/2003 | Kohashi et al. | 348/246 |
| 7,015,961 B2 * | 3/2006 | Kakarala | 348/246 |
| 7,042,499 B1 * | 5/2006 | Kido et al. | 348/211.14 |
| 7,206,020 B2 * | 4/2007 | Kato | 348/247 |
| 2003/0063203 A1 | 4/2003 | Ohno | |
| 2004/0032516 A1 | 2/2004 | Kakarala | |
| 2008/0122925 A1 * | 5/2008 | Sekimoto et al. | 348/65 |

FOREIGN PATENT DOCUMENTS

| | | |
|---|---|---|
| JP | A 05-041868 | 2/1993 |
| JP | A 06-153087 | 5/1994 |

(Continued)

OTHER PUBLICATIONS

Aug. 30, 2011 Office Action issued in JP Application No. 2007-532132 (with English translation).

*Primary Examiner* — Ngoc-Yen Vu
(74) *Attorney, Agent, or Firm* — Oliff & Berridge, PLC

(57) ABSTRACT

An image processing system can realize a more accurate and high-quality correction of defective pixels by including an image pickup device, an obtaining unit obtaining information showing positions of defective pixels occurred at the image pickup device, a creating unit creating discrimination information showing the positions of the defective pixels in an image generated via the image pickup device, a detecting unit detecting a correlativity with neighborhood pixels by each defective pixel, and an estimating unit estimating a pixel value by each defective pixel in accordance with a detected result by the detecting unit. Incidentally, the image processing system is configured by an imaging device and a computer recording an image processing program, in which the imaging device includes the image pickup device, the obtaining unit, and the creating unit, and the image processing program may make the computer function as the detecting unit and the estimating unit.

2 Claims, 7 Drawing Sheets

FOREIGN PATENT DOCUMENTS

| | | |
|---|---|---|
| JP | A-11-220661 | 8/1999 |
| JP | A 2000-287135 | 10/2000 |
| JP | 2002-176586 * | 6/2002 |
| JP | A 2002-176586 | 6/2002 |
| JP | A-2003-116060 | 4/2003 |
| JP | A 2004-80761 | 3/2004 |
| JP | A 2004-297687 | 10/2004 |
| JP | A 2005-020682 | 1/2005 |

* cited by examiner

A

B

A

B

IMAGE PROCESSING SYSTEM AND IMAGE PROCESSING PROGRAM FOR DEFECTIVE PIXEL CORRECTION

CROSS-REFERENCE TO RELATED APPLICATION

This application is a U.S. National Stage application claiming the benefit of prior filed International Application Number PCT/JP2006/316425, filed Aug. 22, 2006, in which the International Application claims a priority date of Aug. 23, 2005 based on prior filed Japanese Application Number 2005-241570, the entire contents of which are incorporated herein by reference.

TECHNICAL FIELD

The present invention relates to an image processing system and an image processing program correcting defective pixels.

BACKGROUND ART

Conventionally, an image pickup device is widely used as a device for a photoelectric conversion, in an imaging device such as an electronic camera. There is a case when defective pixels occur caused by a defect of a light-receiving element or nonuniformity of a light-receiving surface in such image pickup device. An output of pixels becomes abnormal in such defective pixels, and they are reproduced as a bright spot or a black spot. An art such as a replacement is used to correct the defective pixels as stated above (for example, refer to Patent Document 1).
Patent Document 1: Japanese Unexamined Patent Application Publication No. H05-41868

DISCLOSURE

Problems to be Solved

However, there has been a case when a satisfying correction effect cannot be obtained because it is difficult to perform a sufficient correction, depending on a state of a subject or a condition at a photographing time in the invention of the above-stated Patent Document 1.

An object of the present invention is to provide an image processing system and an image processing program capable of realizing a more accurate and high-quality correction of defective pixels.

Means For Solving The Problem

An image processing system according to the present invention includes: an image pickup device; an obtaining unit obtaining information showing positions of defective pixels occurred at the image pickup device; a creating unit creating discrimination information showing the positions of the defective pixels in an image generated via the image pickup device; a detecting unit detecting a correlativity with neighborhood pixels by each defective pixel; and an estimating unit estimating a pixel value by each defective pixel in accordance with a detected result by the detecting unit.

Note that preferably, the image processing system is configured by an imaging device and a computer recording an image processing program, in which the imaging device may include the image pickup device, the obtaining unit, and the creating unit, and the image processing program may make the computer function as the detecting unit and the estimating unit.

Also preferably, the creating unit of the imaging device may create the discrimination information as header information of the image, and the computer may obtain the header information together with the image.

Also preferably, the image processing system further includes: an interpolating unit performing an interpolation processing for the image, and the detecting unit and the estimating unit may perform a detection of the correlativity and an estimation of the pixel value when the interpolating unit performs the interpolation processing.

Also preferably, the detecting unit may determine whether a pixel adjacent to the defective pixel is a defective pixel or not based on the discrimination information.

Also preferably, the estimating unit may estimate the pixel value of the defective pixel based on a pixel value of a nearest neighborhood pixel with a same color when three or more defective pixels including the defective pixel continuously exist in an arbitrary direction, and a direction in which these defective pixels continue and a direction having a highest correlativity are the same.

Also preferably, the creating unit may replace the pixel value of the defective pixel into at least one of a maximum value and a minimum value capable of being taken by the pixel value as a creation of discrimination information showing a position of the defective pixel in the image.

Also preferably, the image processing system further includes: an image processing unit performing an image processing including at least one of a white balance adjustment, a color processing, and a gradation conversion processing for the image before the estimation of the pixel value is performed by the estimating unit, and the image processing unit may perform the image processing without changing the discrimination information.

Also preferably, the creating unit may perform the creation of the discrimination information under a state having most gradation information in an imaging system by the image pickup device.

An image processing program according to the present invention, realizing an image processing for an image having discrimination information showing that a pixel is a defective pixel at a position of the defective pixel by a computer, the image processing program includes: an obtaining step obtaining the image having the discrimination information showing that the pixel is the defective pixel; a replacing step replacing a pixel value of the defective pixel based on a pixel value of a neighborhood; and an interpolating step performing an interpolation processing for the image, and the replacing step replaces the pixel value of the defective pixel based on the pixel value of the neighborhood during a period until the interpolation processing is completed in the interpolating step.

Effect

According to the image processing system and computer-readable medium carrying the image processing program of the present invention, it is possible to realize a more accurate and high-quality connection of defective pixels.

DETAILED DESCRIPTION OF THE EMBODIMENTS

First Embodiment

Hereinafter, a first embodiment of the present invention is described by using the drawings. In the first embodiment, a description is made by using an electronic camera 1 including an image processing system of the present invention.

Figure 1:
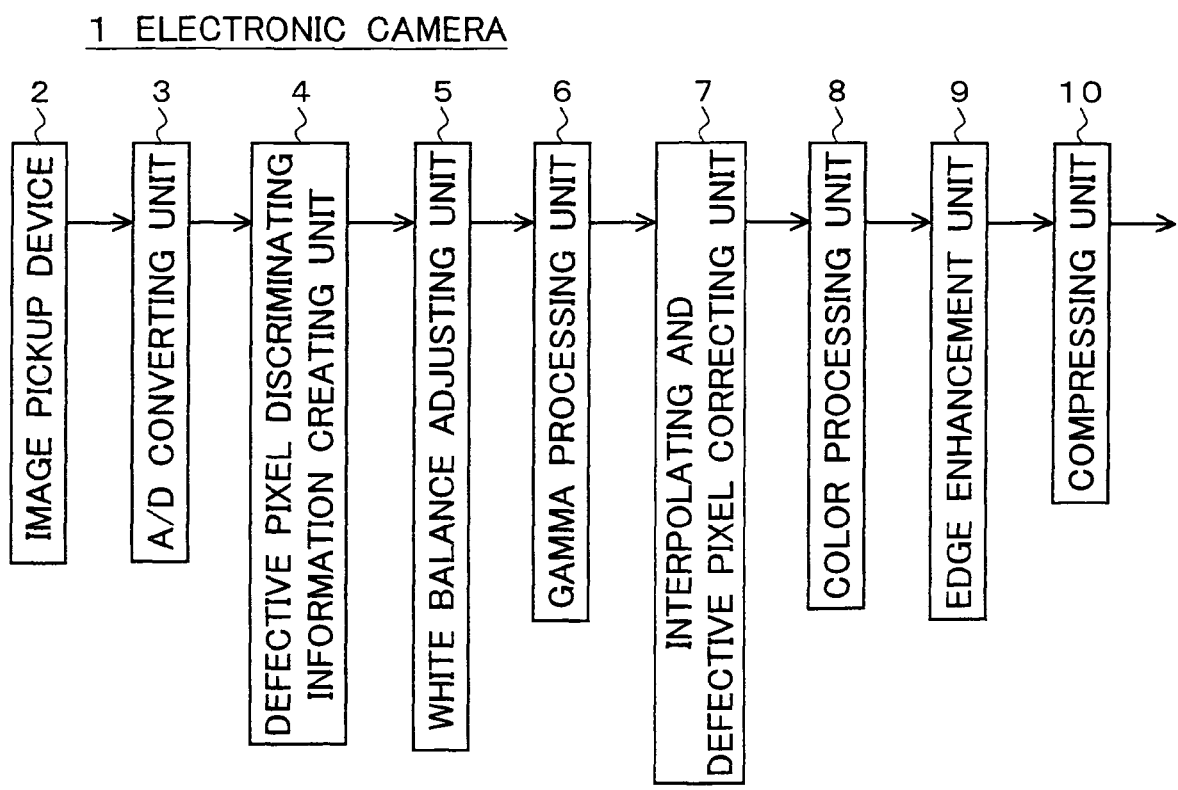
FIG. 1 is a view showing a configuration and a process flow of an electronic camera 1 of a first embodiment.

As shown in FIG. 1, the electronic camera 1 includes an image pickup device 2 picking up an image of a subject image, an A/D converting unit 3 performing an A/D conversion, a defective pixel discriminating information creating unit 4 creating discrimination information which is a characteristic of the present invention, a white balance adjusting unit 5 performing a white balance adjustment, a gamma processing unit 6 performing a gamma processing, an interpolating and defective pixel correcting unit 7 performing an interpolation processing and a defective pixel correction which is a characteristic of the present invention, a color processing unit 8 performing a color reproduction processing, a color space conversion, and so on, an edge enhancement unit 9 performing an edge enhancement processing, and a compressing unit 10 compressing an image.

A signal outputted from the image pickup device 2 is converted from an analog signal into a digital signal at the A/D converting unit 3. In a conventional art, address information of a defective pixel is detected after the above-stated A/D conversion, and a pixel value of the corresponding pixel is replaced with a neighborhood value based on the detected address information. Besides, in the present embodiment, the image pickup device 2 has a bayer pattern.

In the present embodiment, the discrimination information showing that the pixel is the defective pixel is created at the defective pixel discriminating information creating unit 4 after the A/D conversion. For example, when the A/D converting unit 3 has an accuracy of 12 bits, the pixel value of the defective pixel is replaced with "4095". "4095" is a maximum value capable of being taken by the pixel value, and a fact that the pixel value is "4095" becomes a mark showing that the pixel is the defective pixel as it is. Incidentally, it may have a configuration in which the defective pixel is automatically detected not from the address information of the defective pixel but from an average value of the neighborhood pixels and so on.

After the replacement of the pixel value at the defective pixel is performed, the white balance adjusting unit 5 performs a white balance adjustment, and the gamma processing unit 6 performs the gamma processing. Concrete methods of the white balance adjustment and the gamma processing are similar to well-known arts, and therefore, descriptions thereof are not given. However, when the mark (pixel value: 4095) showing that the pixel is the defective pixel is detected in the respective processes, the white balance adjusting unit 5 performs an image processing without changing the discrimination information, by performing the following processes.

Namely, when a data before the white balance adjustment is set as "Db", and a data after the white balance adjustment is set as "Da", a clip processing as follows is performed.

if Db=4095 then Da=4095
if Db≠4095 then
if Da≧4095 then Da=4095

The gamma processing unit 6 also performs the image processing without changing the discrimination information by performing the similar process.

Next, the interpolating and defective pixel correcting unit 7 performs the correction processing of the defective pixel simultaneously with the interpolation.

Figure 2:
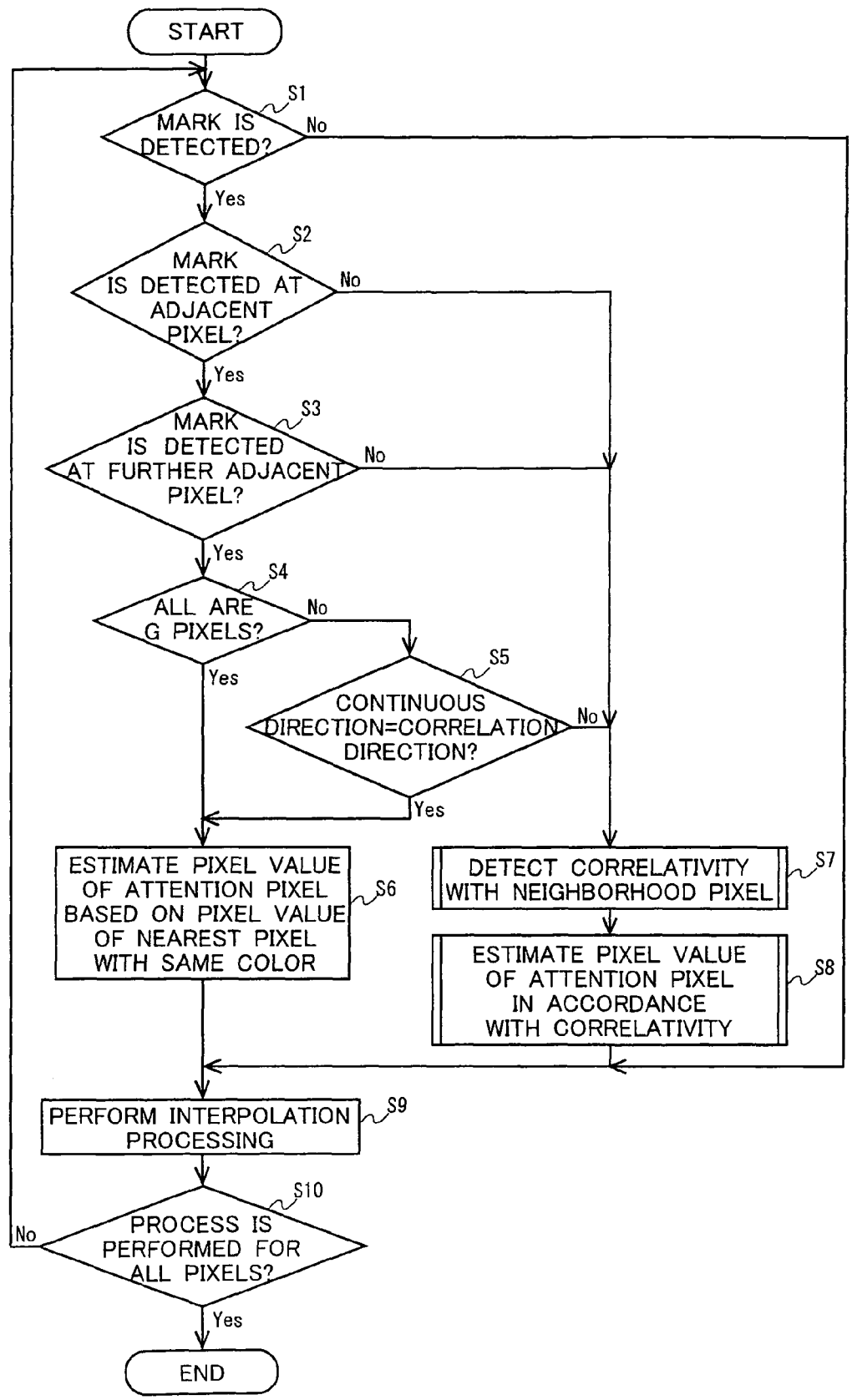
FIG. 2 is a flowchart showing operations of an interpolating and defective pixel correcting unit 7.

FIG. 2 is a flowchart showing operations of the interpolating and defective pixel correcting unit 7.

In step S1, the interpolating and defective pixel correcting unit 7 checks the pixels included in the image after the gamma processing in an order defined in advance, and determines whether the mark (pixel value: 4095) showing that the pixel is the defective pixel is detected or not. Incidentally, in the present embodiment, the check begins from a pixel at an upper left to go on in a right direction, and goes to a pixel at the left edge of a second line after a first line is finished. The interpolating and defective pixel correcting unit 7 goes to step S2 when it is determined that the mark is detected. On the other hand, the interpolating and defective pixel correcting unit 7 goes to later-described step S9 when the mark is not detected even if all of the pixels included in the image after the gamma processing are checked.

Figure 3:
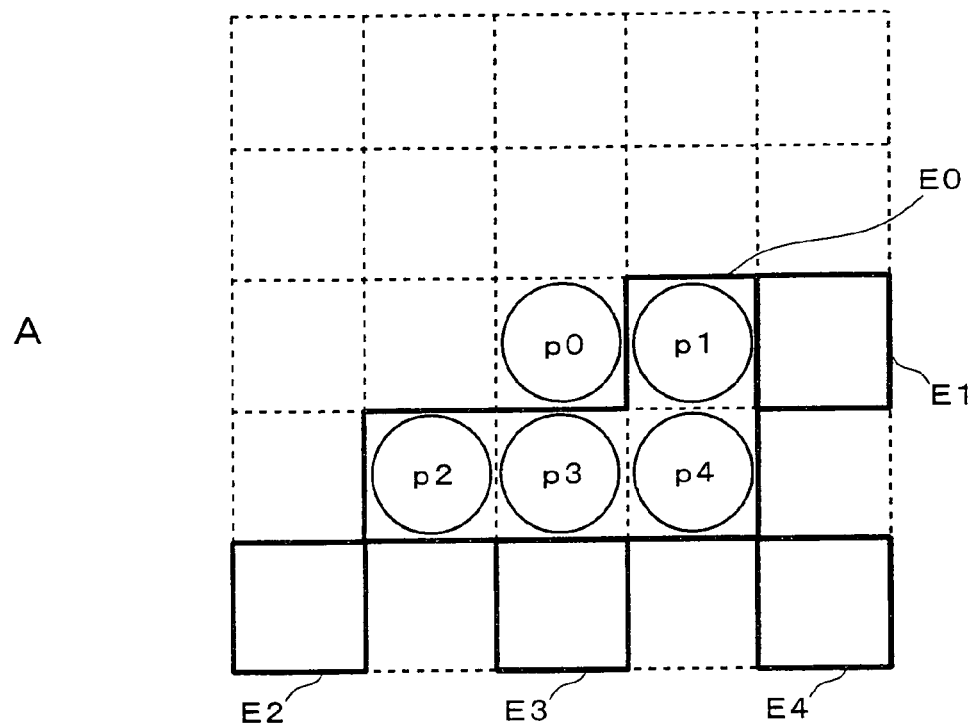
FIG. 3 are views explaining a correction of a defective pixel.
Figure 3:
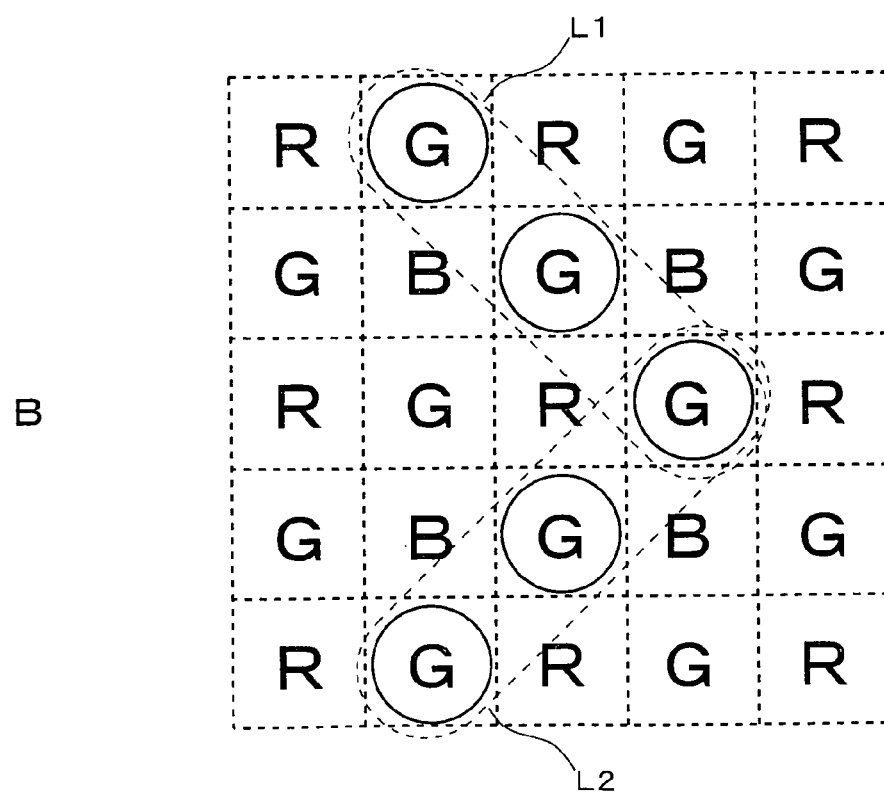

In the step S2, the interpolating and defective pixel correcting unit 7 determines whether the mark is detected or not at the pixel adjacent to the pixel in which the mark is detected (hereinafter, it is called as an "attention pixel"). For example, when a pixel p0 in which "○ (circled portion)" is marked in FIG. 3A is the attention pixel, the interpolating and defective pixel correcting unit 7 determines whether the mark exists at the four pixels shown in a frame E0 or not, then goes to step S3 when it is determined that the mark is detected at the pixels adjacent to the attention pixel, and goes to later-described step S7 when it is determined that the mark is not detected at the pixels adjacent to the attention pixel.

In the step S3, the interpolating and defective pixel correcting unit 7 determines whether the mark is detected at further adjacent pixels or not. For example, in the step S2, when the mark is detected at a pixel p1 in which "○ (circled portion)" is marked in FIG. 3A, the interpolating and defective pixel correcting unit 7 determines whether the mark exists at the pixels shown in a frame E1 or not. Besides, in the step S2, when the mark is detected at pixels p2, 3, 4 in which "○ (circled portion)" are marked in FIG. 3A, the interpolating and defective pixel correcting unit 7 determines whether the mark exists at the pixels shown in frames E2, 3, 4 or not, respectively. The interpolating and defective pixel correcting unit 7 goes to step S4 when it is determined that the mark is detected in the further adjacent pixels, and goes to the later-described step S7 when it is determined that the mark is not detected in the further adjacent pixels. Incidentally, in the step S3, a case of "YES" is a case when three marks exist continuously (the defective pixels exist) in either of vertical, horizontal, or diagonal directions.

In the step S4, the interpolating and defective pixel correcting unit 7 determines whether all of the marks detected from the step S1 to the step S3 are G pixels or not. The image pickup device 2 of the present embodiment has the bayer pattern, and therefore, all pixels are the G pixels means that the marks are detected at the G pixels continue diagonally as shown by L1 or L2 shown in FIG. 3B. When it is determined that all of the pixels are the G pixels, the interpolating and defective pixel correcting unit 7 goes to later-described step S6. On the other hand, when it is determined that not all of the pixels are the G pixels (at least two pixels among the G pixel, R pixel, B pixel are included), it goes to step S5.

Figure 4:
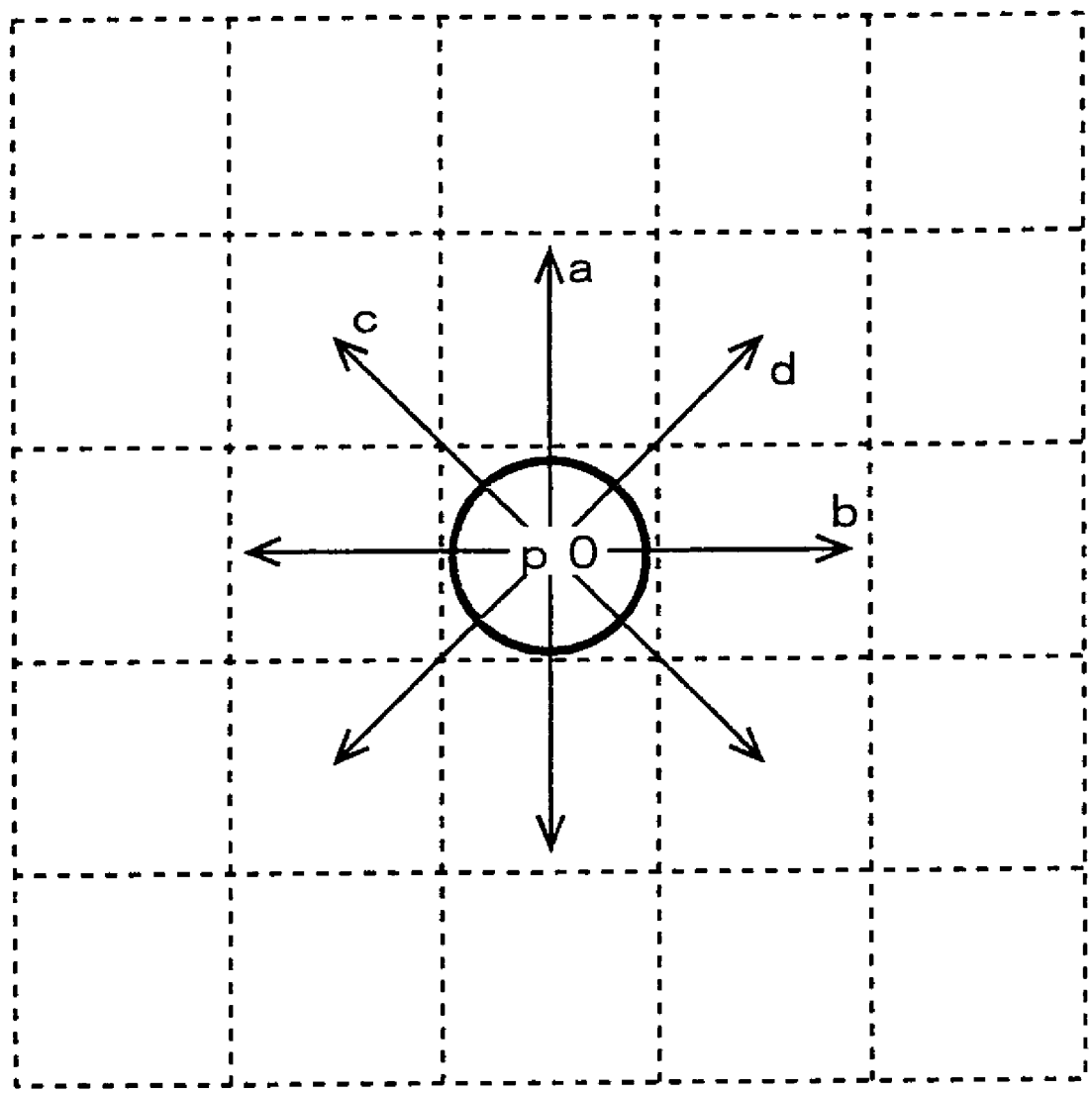
FIG. 4 is another view explaining the correction of the defective pixel.

In the step S5, the interpolating and defective pixel correcting unit 7 determines whether a continuous direction of the defective pixels and a correlation direction are the same or not. At first, the interpolating and defective pixel correcting unit 7 detects a correlativity between the attention pixel and neighborhood pixels thereof. For example, the interpolating and defective pixel correcting unit 7 detects the correlativity in four directions of vertical, horizontal, diagonal directions ("a" to "ad") while setting the attention pixel p0 as a center, as shown in FIG. 4. Subsequently, the interpolating and defective pixel correcting unit 7 determines whether the correlation direction of which correlativity is the highest and the continuous direction of the defective pixels are the same or not. The interpolating and defective pixel correction unit 7 goes to step S6 when it is determined that the continuous direction of the defective pixels and the correlation direction are the same. On the other hand, the interpolating and defective pixel correction unit 7 goes to the later-described step S7 when it is determined that the continuous direction of the defective pixels and the correlation direction are not the same.

In the step S6, the interpolating and defective pixel correcting unit 7 estimates a pixel value of the attention pixel based on a pixel value of the nearest neighborhood pixel with the same color. The interpolating and defective pixel correcting unit 7 then goes to later-described step S9.

In the step S7, the interpolating and defective pixel correcting unit 7 detects the correlativity between the attention pixel and the neighborhood pixels. A concrete method of the detection is described later. Incidentally, cases when the process of the step S7 is performed are the following: a case when it is determined that the defective pixels do not continue three or more by the determinations in the step S2 and the step S3; and a case when it is determined that the continuous direction of the defective pixels and the correlation direction are not the same by the determination of the step S5. In this case, the interpolating and defective pixel correcting unit 7 performs a later-described correction of the defective pixels.

In step S8, the interpolating and defective pixel correcting unit 7 estimates the pixel value of the attention pixel based on the correlativity detected at the step S7. A concrete method of the estimation is described later.

In the step S9, the interpolating and defective pixel correcting unit 7 performs an interpolation processing similar to a publicly known art. Incidentally, it is advisable that the interpolation processing is performed by using information relating to the correlativity detected at the above-stated respective steps in the interpolation processing. Incidentally, the interpolation processing similar to the publicly known art is also performed in a case when the mark (pixel value: 4095) showing that the pixel is the defective pixel is not detected in the step S1.

In the step S10, the interpolating and defective pixel correcting unit 7 determines whether the process is performed on all the pixels included in the image after the gamma processing or not. A series of processes are completed when it is determined that the process is performed on all the pixels. On the other hand, when the process is not performed on all the pixels, the interpolating and defective pixel correcting unit 7 goes back to the step S1, and performs the processes from the step S1 in a subsequent pixel.

After the interpolating and defective pixel correcting unit 7 completes a series of processes described in the flowchart in FIG. 2, the color processing unit 8 performs the color processing for the image after the interpolation and defective pixel correction, the edge enhancement unit 9 performs the edge enhancement, and the image is compressed at the compressing unit 10 to be outputted to a not-shown recording unit and so on. Incidentally, concrete methods of the color processing, the edge enhancement, the compression, and so on are similar to the publicly known art, and therefore, the description is not given.

Next, details of the detection of the correlativity and the estimation of the pixel value of the attention pixel described in the step S7 and the step S8 of the flowchart in FIG. 2 are described.

<First Method>

Figure 5:
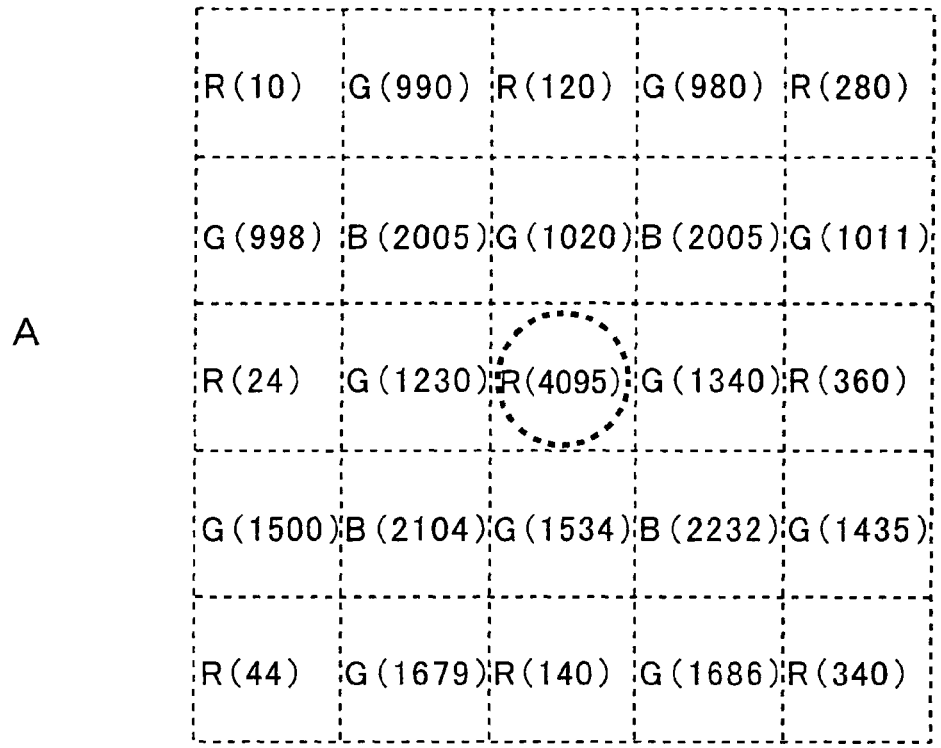
FIG. 5 are still other views explaining the correction of the defective pixel.
Figure 5:
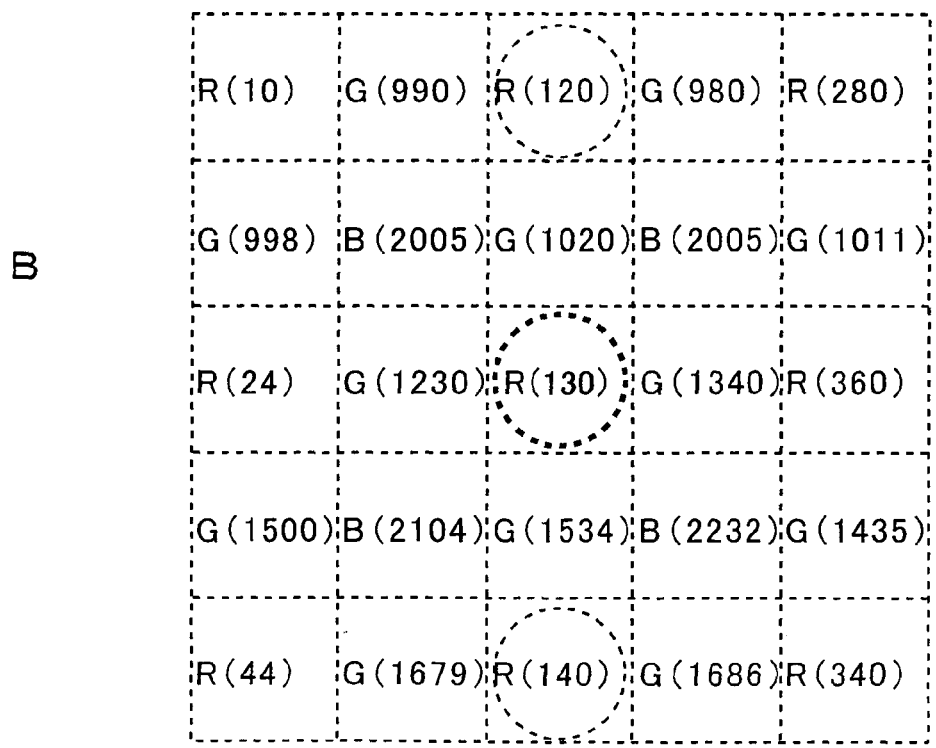

The interpolating and defective pixel correcting unit 7 detects the correlativity between the attention pixel and the neighborhood pixels. The interpolating and defective pixel correcting unit 7 detects the correlativity in the four directions of the vertical, horizontal, and diagonal ("a" to "d") directions shown in FIG. 4. For example, when the attention pixel is the R pixel of a center in FIG. 5A, the vertical direction (the direction of an arrow "a" in FIG. 4) having the highest correlativity is decided as a direction of correction from among the detected correlativity in the respective directions. The pixel value of the attention pixel is estimated by asking an average value of the pixels of the up and down in the vertical direction, and performing a replacement, as shown in FIG. 5B.

<Second Method>

Figure 6:
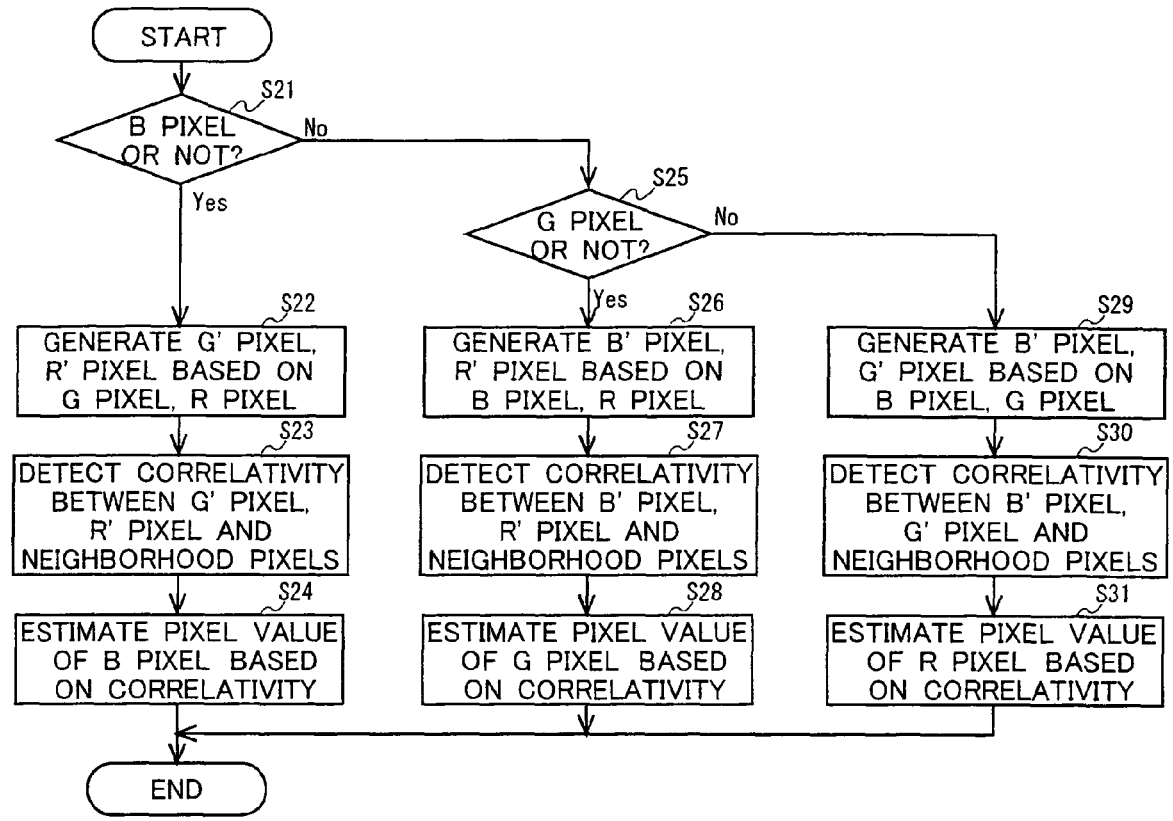
FIG. 6 is another flowchart showing the operations of the interpolating and defective pixel correcting unit 7.

FIG. 6 is a flowchart showing the operations of the interpolating and defective pixel correcting unit 7 when a second method is performed.

In step S21, the interpolating and defective pixel correcting unit 7 determines whether the attention pixel is the B pixel or not. The interpolating and defective pixel correcting unit 7 goes to step S22 when it is determined that the attention pixel is the B pixel. On the other hand, when it is determined that the attention pixel is not the B pixel (it is the G pixel or the R pixel), it goes to later-described step S25.

In the step S22, the interpolating and defective pixel correcting unit 7 interpolates a G pixel component and an R pixel component of the attention pixel based on the pixel values of the G pixel and the R pixel adjacent to the B pixel being the attention pixel. The G pixel component generated by the interpolation is called as a "G' pixel", and the R pixel component is called as an "R' pixel".

In step S23, the interpolating and defective pixel correcting unit 7 detects the correlativity with the neighborhood G pixel and R pixel by using the G' pixel and the R' pixel generated at the step S22.

In step S24, the interpolating and defective pixel correcting unit 7 estimates the pixel value of the B pixel being the attention pixel based on the correlativity detected at the step S23. The interpolating and defective pixel correcting unit 7 decides the direction of correction based on the correlativity in the respective directions detected at the step S23, and estimates the pixel value of the attention pixel by asking the average value and so on of the neighborhood pixels in the direction of correction and performing the replacement.

In the step S21, when it is determined that the attention pixel is not the B pixel (it is the G pixel or the R pixel), the interpolating and defective pixel correcting unit 7 determines whether the attention pixel is the G pixel or not in the step S25. The interpolating and defective pixel correcting unit 7 goes to step S26 when it is determined that the attention pixel is the G pixel. On the other hand, when it is determined that the attention pixel is not the G pixel (it is the R pixel), it goes to later-described step S29.

From the step S26 to the step S28, the interpolating and defective pixel correcting unit 7 performs the processes following the above-stated step S22 to step S24. Namely, in the step S26, the B pixel component ("B' pixel") and the R pixel component ("R' pixel") of the attention pixel is interpolated based on the pixel values of the B pixel and the R pixel adjacent to the G pixel being the attention pixel. In step S27, the correlativity with the neighborhood B pixel and R pixel is detected by using the B' pixel and the R' pixel. In the step S28, the pixel value of the G pixel being the attention pixel is estimated based on the correlativity detected at the step S27.

Besides, from the step S29 to the step S31, the interpolating and defective pixel correcting unit 7 performs the processes following the above-stated step S22 to step S24. Namely, in the step S29, the B pixel component ("B' pixel") and the G pixel component ("G' pixel") of the attention pixel is interpolated based on the pixel values of the B pixel- and the G pixel adjacent to the R pixel being the attention pixel. In the step S30, the correlativity with the neighborhood B pixel and G pixel is detected by using the B' pixel and the G' pixel. In the step S31, the pixel value of the R pixel being the attention pixel is estimated based on the correlativity detected at the step S30.

As it is described hereinabove, according to the first embodiment, the information showing the positions of the defective pixels occurred at the image pickup device is obtained, and the discrimination information showing the positions of the defective pixels in the image generated via the image pickup device is created. The correlativity with the neighborhood pixels is detected by each defective pixel, and the pixel value by each defective pixel is estimated in accordance with the detected result. Accordingly, a more accurate and high-quality correction of the defective pixel can be realized.

Besides, according to the first embodiment, the detection of the correlativity and the estimation of the pixel value are performed when the interpolation processing is performed for the image. Accordingly, it is possible to efficiently perform the detection of the correlativity and the estimation of the pixel value by using correlative information calculated in the interpolation processing.

Besides, according to the first embodiment, it is determined whether the pixel adjacent to the defective pixel is the defective pixel or not based on the discrimination information. Accordingly, the correction in accordance with a state of the pixel adjacent to the noticed defective pixel can be realized.

Besides, according to the first embodiment, the pixel value of the noticed defective pixel is estimated based on the pixel value of the nearest neighborhood pixel with the same color when three or more defective pixels including the noticed defective pixel exist continuously in an arbitrary direction, and the direction in which these defective pixels continue and the direction having the highest correlativity are the same. Accordingly, deterioration of the image can be suppressed to be minimum as for the defective pixel in which the defective pixel correction of the present invention is not appropriate.

Besides, according to the first embodiment, the pixel value of the defective pixel is replaced with at least one of the maximum value or the minimum value capable of being taken by the pixel value, as the creation of the discrimination information showing the position of the defective pixel in the image. Accordingly, it is possible to embed the discrimination information in the image in itself.

Besides, according to the first embodiment, the image processing including at least one of the white balance adjustment, the color processing, and a gradation conversion processing for the image before the estimation of the pixel value is performed. At this time, the image processing is performed without changing the discrimination information. Accordingly, it is possible to continue to keep the discrimination information during a period until the estimation of the pixel value is performed, and to perform the estimation of the pixel value accurately.

Incidentally, in the first embodiment, an example is shown in which the mark (pixel value: "4095") showing that the pixel is the defective pixel is used as the discrimination information, but address information of the defective pixel may be created as header information at the defective pixel discriminating information creating unit 4.

Second Embodiment

Figure 7:
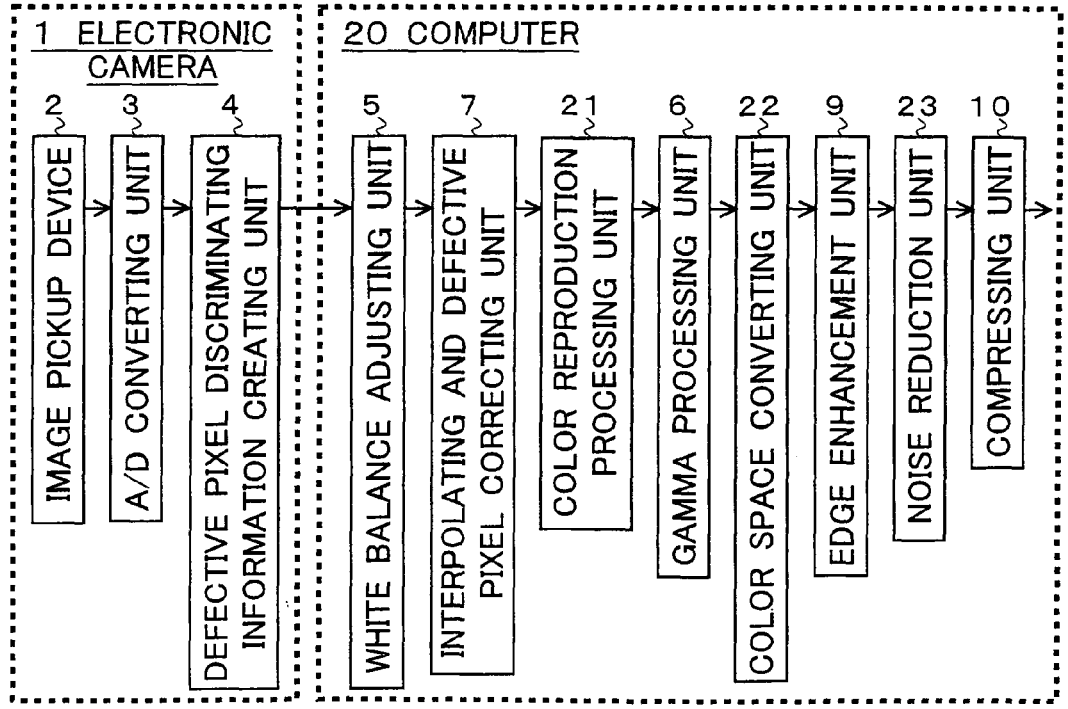
FIG. 7 is a view showing a configuration and a process flow of an image processing system 100 of a second embodiment.

Hereinafter, a second embodiment of the present invention is described by using the drawings. In the second embodiment, a description is made by using an image processing system 100 configured by an electronic camera and a computer, as shown in FIG. 7.

The electronic camera of the second embodiment has a configuration similar to the electronic camera of the first embodiment. Accordingly, hereinafter, the description is made by using the reference numerals similar to the electronic camera 1 of the first embodiment. However, in the second embodiment, the electronic camera 1 outputs an image data after discrimination information is created by the defective pixel discriminating information creating unit 4, to a computer 20 as same as the first embodiment. When the discrimination information is a specific pixel value (4095 in the first embodiment), only the image is outputted, and when the discrimination information is header information including (address information of the defective pixel), the header information is outputted together with the image. Besides, the description is made by using the similar reference numerals to the first embodiment as for the configuration similar to the electronic camera 1 of the first embodiment.

When the image is obtained from the electronic camera 1, the white balance adjusting unit 5 performs the white balance adjustment as same as the first embodiment. Incidentally, in the respective processes, when the discrimination information showing that the pixel is the defective pixel is detected, the white balance adjusting unit 5 performs the image processing without changing the discrimination information as same as the first embodiment.

The interpolating and defective pixel correcting unit 7 performs a correction processing of the defective pixel simultaneously with the interpolation for the image after the white balance adjustment. In the first embodiment, the correction processing of the defective pixel is performed simultaneously with the interpolation for the image after the gamma processing by the gamma processing unit 6. Compared to the above, in the second embodiment, the correction processing of the defective pixel is performed simultaneously with the interpolation for the image before the gamma processing. Namely, it is possible to realize the more accurate and high-quality correction of the defective pixel in the computer by performing the correction processing of the defective pixel under a state having a lot of gradation information. Incidentally, the interpolation and the defective pixel correction are performed as same as the first embodiment.

A color reproduction processing unit 21 performs a color reproduction processing for the image after the defective pixel correction, the gamma processing unit 6 performs the gamma processing, and a color space converting unit 22 performs a color space conversion from RGB to YCbCr. Incidentally, concrete methods of the color reproduction processing and the color space conversion are similar to the publicly known art, and therefore, the description is not given. Incidentally, the gamma processing unit 6 performs the gamma processing for the image after the defective pixel correction which is different from the first embodiment, and therefore, it is not necessary to pay attention to the change of the discrimination information as in the first embodiment.

Further, the edge enhancement unit 9 performs the edge enhancement, a noise reduction unit 23 performs a noise reduction, and the image is compressed at the compressing unit 10, to be outputted to a not-shown recording unit and so on. Incidentally, concrete methods of the edge enhancement, the noise reduction, the compression, and so on are similar to the publicly known art, and therefore, the description is not given.

As stated above, according to the second embodiment, the image processing system is configured by the imaging device and the computer recording the image processing program, the imaging device obtains the information showing the position of the defective pixel occurred in the image pickup device, and creates the discrimination information showing the position of the defective pixel in the image generated via the image pickup device. The computer detects the correlativity with the neighborhood pixels by each defective pixel, and estimates the pixel value by each defective pixel in accordance with the detected result. Accordingly, it is possible to realize the more accurate and high-quality correction of the defective pixel. Besides, it is possible to realize the high-quality correction of the defective pixel corresponding to user's needs in the computer as well as reducing the processes at the imaging device.

Besides, according to the second embodiment, the imaging device creates the discrimination information as the header information of the image, and the computer obtains the header information together with the image. Accordingly, the discrimination information can be used without performing the replacement of the pixel value. Besides, it is possible to keep the discrimination information without changing it even if the compression processing is performed during a period until the image is supplied from the imaging device to the computer.

Besides, according to the second embodiment, the creation of the discrimination information is performed under a state having the most gradation information, in an imaging system by the image pickup device. Accordingly, it is possible to realize the more accurate and high-quality correction of the defective pixel.

Besides, according to the second embodiment, the pixel value of the defective pixel is replaced based on the neighborhood pixel value during the period until the interpolation processing is completed, when the image processing for the image having the discrimination information showing that the pixel is the defective pixel is realized by the computer at the position of the defective pixel. Accordingly, the correction of the defective pixel can be realized more accurately.

Incidentally, when the image is supplied from the imaging device to the computer as in the second embodiment, it is better not to perform the compression processing of the image. This is to keep the discrimination information certainly. Alternatively, the minimum value may be used as the mark showing that the pixel is the defective pixel instead of using the maximum value capable of being taken by the pixel value, as it is described in the first embodiment or the both may be used. Namely, when an output value is larger than an intermediate value, the maximum value is used, and when the output value is smaller than the intermediate value, the minimum value is used. It becomes possible to keep the discrimination information without changing it even when the compression processing is performed during the period until the image is supplied from the imaging device to the computer, by using the two kinds of values as stated above.

Besides, there is a case when a program on a computer at a receiving side cannot recognize the "mark showing that the pixel is the defective pixel" (discrimination information) included in an RAW data and so on, when the image is supplied from the imaging device to the computer as in the second embodiment, especially when image data such as the RAW data is outputted. Namely, it is not possible to perform an appropriate correction of the defective pixel in the image processing program of the computer unable to recognize the mark even if the minimum value and the maximum value are used as the "mark showing that the pixel is the defective pixel", and therefore, the bright spot and the black spot may appear.

It is therefore possible to use a last digit of a digital value of the image data such as the RAW data as the "mark showing that the pixel is the defective pixel". For example, all of the last digits of the defective pixels are set as "0" (zero), and all of the last digits of the non-defective pixels are set as "1". Namely, all of the defective pixels of which last digits are "1" are changed into "0" (zero). On the other hand, all of the non-defective pixels of which last digits are "0" (zero) are changed into "1". As stated above, there is seldom effect on the actual pixel value even if the last digit of the digital value is changed. Accordingly, it becomes possible to suppress deterioration of the image into minimum even when the program of the computer at the receiving side cannot recognize the "mark showing that it is the defective pixel" included in such as the RAW data, by using the last digit of the digital value as the mark.

Incidentally, when the above-stated "mark showing that the pixel is the defective pixel" is created, the last digit of the digital value may be used as the mark as for the defective pixel in itself in the image data outputted by the A/D converting unit 3, or for example, the correction by the replacement may be performed for the image data outputted by the A/D converting unit 3 as in the publicly known art, and the last digit of the digital value of the defective pixel in the image data after the correction may be used as the mark.

Besides, in the second embodiment, an example in which the image is obtained from the electronic camera is shown, but the image may be obtained from other external equipment, recording medium, or the like as long as the image to be obtained has the discrimination information of the present invention. Besides, the program as stated above may be provided on Internet, and the correction of the defective pixel may be performed on the Internet.

Besides, in the above-stated respective embodiments, the description is made by using the image pickup device of the bayer pattern, but the present invention may be applied to an image pickup device of the other patterns.

Besides, pixels which do not perform a proper output in accordance with an amount of light received (making no reaction even if the light is received, making a reaction though the light is not received, and so on), a fixed pattern noise, or the like correspond to the defective pixel in the above-stated respective embodiments.

Besides, an order of the respective processes in the above-stated respective embodiments are not limited to this example. The order may be exchanged or a part thereof may be omitted in accordance with a configuration, a required image quality, and so on. For example, the interpolation and the correction of the defective pixel may be performed separately.

Figure 8:
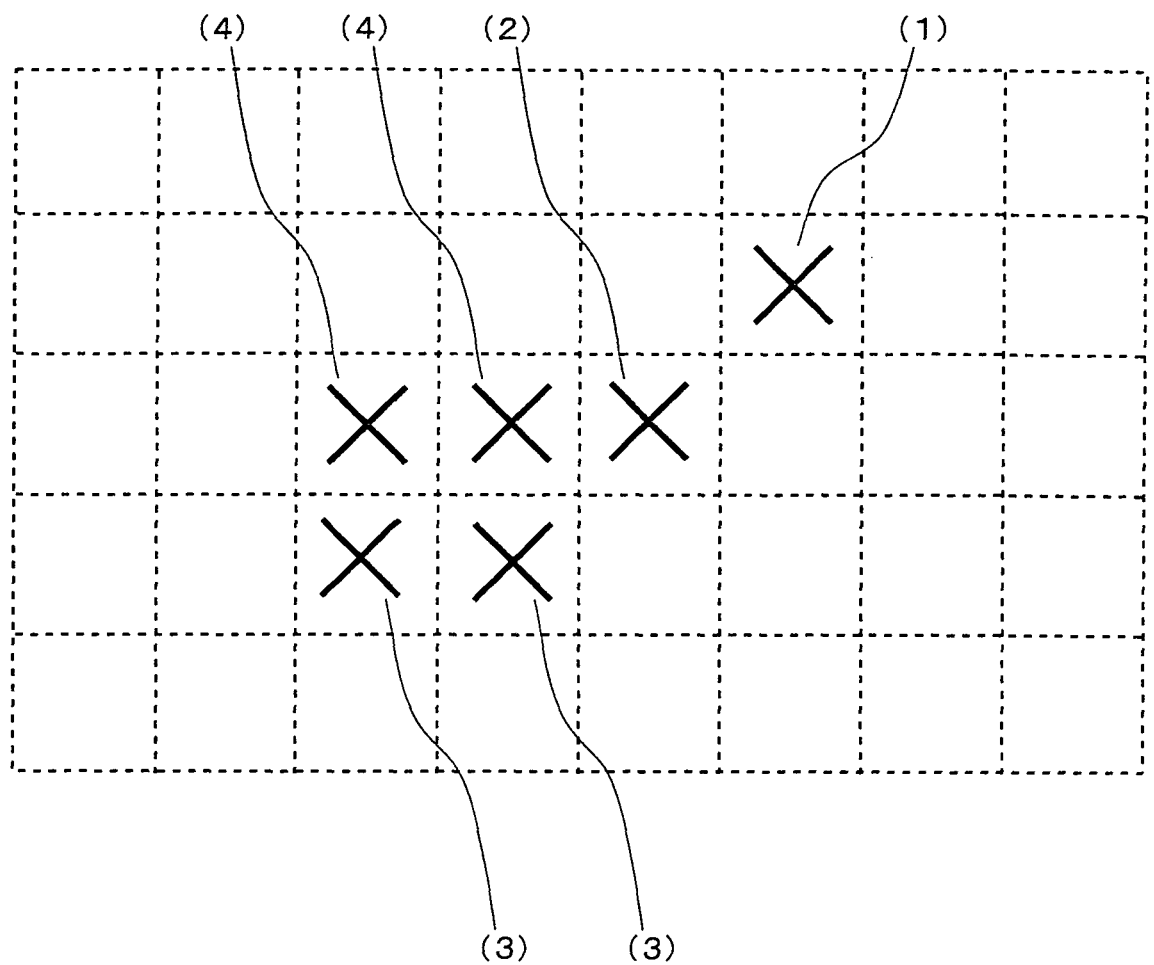
FIG. 8 is another view explaining the correction of the defective pixels.

For example, it may have a configuration in which the pixel values of the defective pixels are estimated in sequence firstly from the defective pixel in good condition, and the interpolation processing is performed for a whole after the pixel values of all pixels are gathered, because it is difficult to correspond to a case by the above-stated method when the defective pixels (the pixels in which "x" are added) continue in complicated state as shown in FIG. 8. Incidentally, the defective pixel in good condition is a pixel in which the number of the defective pixels in the adjacent pixels is fewer. In the example in FIG. 8, at first, the defective pixel shown by (1) is corrected (the pixel value is estimated). The defective pixel shown by (2) which becomes in good condition as a result of the above correction is corrected. Further, the defective pixel shown by (3) is corrected, and thereby, the defective pixel shown by (4) can be corrected in good condition.

The many features and advantages of the embodiments are apparent from the detailed specification and, thus, it is intended by the appended claims to cover all such features and advantages of the embodiments that fall within the true spirit of scope thereof. Further, since numerous modifications and changes will readily occur to those skilled in the art, it is not desired to limit the inventive embodiments to exact construction and operation illustrated and detailed, and accordingly all suitable modifications and equivalents may be resorted to, falling within the scope thereof.

The invention claimed is:

1. An image processing system, comprising:
an image pickup device;
an obtaining unit obtaining information showing positions of defective pixels occurred at said image pickup device;
a creating unit creating discrimination information showing the positions of said defective pixels in an image generated via said image pickup device;
an interpolating unit performing an interpolation processing for said image;
a detecting unit detecting a correlativity with neighborhood pixels for said each defective pixel when said interpolating unit performs said interpolation processing;
a determining unit determining a direction of correction for each said defective pixel based on said correlativity when said interpolating unit performs said interpolation processing; and
an estimating unit estimating a pixel value for said each defective pixel based on a pixel value of a part of a pixel corresponding to said direction of correction among said neighborhood pixels when said interpolating unit performs said interpolation processing; wherein
said detecting unit determines whether a pixel adjacent to said defective pixel is a defective pixel or not based on said discrimination information;
said determining unit determines said direction of correction in accordance with whether or not conditions of three or more defective pixels including said defective pixel continuously exist in an arbitrary direction, and a direction in which these defective pixels continue and a direction having a highest correlativity are the same are met; and
said estimating unit estimates the pixel value of said defective pixel based on a pixel value of a nearest neighborhood pixel with a same color among said neighborhood pixels when said conditions are met, the nearest neighboring pixel corresponding to said direction of correction.

2. An image processing system, comprising:
an image pickup device;
an obtaining unit obtaining information showing positions of defective pixels occurred at said image pickup device;
a creating unit creating discrimination information showing the positions of said defective pixels in an image generated via said image pickup device;
an interpolating unit performing an interpolation processing for said image;
a detecting unit detecting a correlativity with neighborhood pixels for said each defective pixel when said interpolating unit performs said interpolation processing;
a determining unit determining a direction of correction for each said defective pixel based on said correlativity when said interpolating unit performs said interpolation processing; and
an estimating unit estimating a pixel value for said each defective pixel based on a pixel value of a part of a pixel corresponding to said direction of correction among said neighborhood pixels when said interpolating unit performs said interpolation processing; wherein
said detecting unit determines whether a pixel adjacent to said defective pixel is a defective pixel or not based on said discrimination information;
said image pickup device generates said image including a plurality of color components, and
said detecting unit calculates a pixel value of a second color component in said defective pixel of a first color component by performing an interpolation for the first color component of said defective pixel based on a neighboring pixel of the second color component which is different from the first color component, and detects said correlativity between said defective pixel of the first color component and a pixel value of the neighboring pixel of the second color component based on the pixel value of the second color component being calculated.

* * * * *